United States Patent
Gier et al.

(10) Patent No.: US 11,597,188 B2
(45) Date of Patent: *Mar. 7, 2023

(54) WOODEN COMPOSITE BOARD WITH ANTISTATIC PROPERTIES

(71) Applicant: Flooring Technologies Ltd., Kalkara (MT)

(72) Inventors: Andreas Gier, Mandelbachtal (DE); Norbert Kalwa, Horn-Bad Meinberg (DE)

(73) Assignee: Flooring Technologies Ltd., Kalkara (MT)

(*) Notice: Subject to any disclaimer, the term of this patent is extended or adjusted under 35 U.S.C. 154(b) by 0 days.

This patent is subject to a terminal disclaimer.

(21) Appl. No.: 16/835,736

(22) Filed: Mar. 31, 2020

(65) Prior Publication Data

US 2020/0316919 A1 Oct. 8, 2020

(30) Foreign Application Priority Data

Apr. 2, 2019 (EP) .................................. 19166830

(51) Int. Cl.
*B32B 21/14* (2006.01)
*B32B 21/08* (2006.01)
(Continued)

(52) U.S. Cl.
CPC ................ *B32B 21/14* (2013.01); *B32B 7/12* (2013.01); *B32B 21/06* (2013.01); *B32B 21/08* (2013.01);
(Continued)

(58) Field of Classification Search
CPC ......... B32B 21/14; B32B 21/06; B32B 27/30; B32B 7/12; B32B 21/08; B32B 27/14;
(Continued)

(56) References Cited

U.S. PATENT DOCUMENTS 5,266,384 A 11/1993 O'Dell et al.
5,709,976 A 1/1998 Malhotra
(Continued)

FOREIGN PATENT DOCUMENTS

CN 105150640 A 12/2015
EP 0276691 A1 8/1988
(Continued)

OTHER PUBLICATIONS

"Why is particle size important?", A Guidebook to Particle Size Analysis, Horiba Inc., 2012, pp. 1-31.

*Primary Examiner* — Nathan L Van Sell
(74) *Attorney, Agent, or Firm* — The Webb Law Firm

(57) ABSTRACT

A wood-based panel includes at least one carrier board and at least one resin layer disposed side of the board. The at least one resin layer includes carbon-based particles, at least one compound of the formula $R^1_a R^2_b SiX_{(4-a-b)}$, and/or hydrolysis products. X is H, OH, or a hydrolysable moiety selected from the group including halogen, alkoxy, carboxyl, amino, monoalkylamino or dialkylamino, aryloxy, acyloxy, and alkylcarbonyl. $R^1$ is an organic residue selected from the group including alkyl, aryl, and cycloalkyl, which may be interrupted by —O— or —NH—. $R^1$ has at least one functional group $Q_1$ selected from a group containing a hydroxy-, amino, monoalkylamino, carboxy, mercapto, alkoxy, aldehyde, acrylic, acryloxy, methacrylic, methacryloxy, cyano, isocyano and epoxide group, $R^2$ is a non-hydrolyzable organic moiety selected from the group including alkyl, aryl, alkenyl, alkynyl, cycloalkyl, and cycloalkenyl; A is 0, 1, 2, or 3. B is 1, 2, 3, or 4.

19 Claims, 1 Drawing Sheet

(51) Int. Cl.
*B32B 27/14* (2006.01)
*B32B 27/18* (2006.01)
*B32B 27/28* (2006.01)
*B32B 27/30* (2006.01)
*B32B 21/06* (2006.01)
*B32B 7/12* (2006.01)

(52) U.S. Cl.
CPC .............. *B32B 27/14* (2013.01); *B32B 27/18* (2013.01); *B32B 27/283* (2013.01); *B32B 27/30* (2013.01); *B32B 2255/10* (2013.01); *B32B 2255/26* (2013.01); *B32B 2264/108* (2013.01); *B32B 2307/584* (2013.01)

(58) Field of Classification Search
CPC ... B32B 27/18; B32B 27/283; B32B 2255/26; B32B 2255/10; B32B 2264/108; B32B 2307/584; B32B 2317/12; B32B 2607/00; B32B 2307/4026; B32B 2419/04; B32B 2307/554; B32B 2264/102; B32B 2307/21; B32B 2260/028; B32B 2260/046; B32B 2038/0076; B32B 38/004; B32B 38/0036; B32B 37/10; B32B 2255/28; B32B 2250/02; B32B 2250/03; B32B 2250/04; B32B 2250/05; B32B 2255/08; B32B 2255/12; B32B 29/02; B32B 29/005; B32B 33/00; B32B 7/02; B32B 29/06; B44C 5/043; E04F 2290/048; E04F 15/102; E04F 15/107; B82Y 30/00

See application file for complete search history.

(56) References Cited

U.S. PATENT DOCUMENTS

| | | | |
|---|---|---|---|
| 5,824,462 | A | 10/1998 | Ashida et al. |
| 7,122,585 | B2 | 10/2006 | Nicholl et al. |
| 8,835,592 | B2 | 9/2014 | Rukavina et al. |
| 8,912,279 | B2 | 12/2014 | Nakamura et al. |
| 2005/0003163 | A1 | 1/2005 | Krishnan |
| 2010/0064938 | A1* | 3/2010 | Voit ................ C09D 5/38 106/287.1 |
| 2011/0097586 | A1* | 4/2011 | Liao ............... C08F 230/085 428/412 |
| 2019/0126600 | A1 | 5/2019 | Braun et al. |

FOREIGN PATENT DOCUMENTS

| | | | | |
|---|---|---|---|---|
| EP | 0822240 | A1 * | 2/1998 | .......... C09D 183/04 |
| EP | 2272668 | A1 | 1/2011 | |
| EP | 2537653 | A1 | 12/2012 | |
| EP | 2927018 | A1 | 10/2015 | |
| EP | 2537597 | B1 | 8/2016 | |
| EP | 2873523 | B1 * | 4/2017 | ............... B44C 5/04 |
| EP | 3231519 | A1 | 10/2017 | |
| EP | 3231596 | A1 | 10/2017 | |
| KR | 101423280 | B1 | 7/2014 | |
| RU | 2106974 | C1 | 3/1998 | |
| WO | 2017207451 | A1 | 12/2017 | |

\* cited by examiner

WOODEN COMPOSITE BOARD WITH ANTISTATIC PROPERTIES

CROSS-REFERENCE TO RELATED APPLICATION

This application claims priority to European Patent Application No. 19 166 830.0 filed Apr. 2, 2019, the disclosure of which is hereby incorporated by reference in its entirety.

BACKGROUND OF THE INVENTION

Field of the Invention

The present invention concerns a wood-based panel with antistatic properties and a process for the production of the same.

Description of Related Art

For many articles of daily use, an essential requirement is that no electrostatic charging occurs during use. On the one hand, this is unpleasant, as the electrostatic charge for discharge flows off via the user, and on the other hand it can of course also cause damage to electronic components. In some areas, objects that tend to become electrostatically charged are even prohibited for safety reasons.

For these reasons, manufacturers either try to have a special quality in their product range for special applications or to produce all products in at least antistatic quality. This is especially true for floors. Some flooring products have the general advantage of not being prone to electrostatic charging (such as tiles, parquet), whereas other flooring products tend to be highly charged (such as carpets, laminate floors).

In the case of laminate flooring, this is a problem that should not be underestimated, especially in seasons with low humidity. This problem is exacerbated by the use of wood-based panels as carrier materials, as these also have poor electrical conductivity. Although it is possible to increase the electrical conductivity of wood-based panels by adding salts during panel production, this leads to a loss of strength due to the disturbance of the hardening of the glues.

Various solutions have been offered to remedy this deficiency, but in many cases they have not brought about a sustainable improvement of the problem or are not accepted by the user.

One solution to the problem is to raise the relative humidity by humidification devices. This is a relatively expensive solution that only indirectly remedies the shortcoming.

A second solution to the problem is to treat the surface of the laminate floor with a care product that increases the surface conductivity of the laminate floor. This solution has the disadvantage that the effect decreases over time as you walk. This means that the surface treatment must be repeated at regular intervals. This solution is therefore somewhat in conflict with the fact that laminate floors should only be cleaned with a damp cloth.

A much more sustainable solution is to incorporate agents to increase conductivity into the impregnating agents used in the manufacture of laminate flooring. However, the problem often arises that the corresponding chemicals are not particularly soluble in the melamine-formaldehyde resins used for impregnation. In addition, these agents often worsen the very good surface properties of laminate floors.

An idea to avoid this problem is described in EP 2 537 597 B1. During the production of a laminate floor, an agent to increase conductivity is applied in sections to a wood-based panel or to the underside of impregnates, the agent being a PVAC or PUR adhesive containing electrically conductive particles. This procedure ensures that no conductivity increasing agent is directly on the surface of the laminate flooring and thus causes a deterioration of the surface properties.

From U.S. Pat. No. 7,122,585 B2 it is known to apply film-forming polymer compositions with a conductive additive as coating powder on wood materials such as MDF boards. Conductive additives include carbon fibres, carbon nanotubes, activated carbon, metallic fillers, fillers coated with conductive materials or conductive polymers. The coating powder is applied to the wood material using electrostatic methods.

However, the approaches known so far are complex and expensive. The desired effects are also not permanent and product deterioration is accepted.

The present invention was therefore based on the technical object of producing a laminate flooring which has good electrical conductivity. The aim is to avoid a deterioration of surface properties. The increase in conductivity should also result in the lowest possible costs. In addition, it should be possible to incorporate the agent into a formulation without problems. The use of toxic or environmentally problematic agents should be excluded in any case.

SUMMARY OF THE INVENTION

According to the invention, this object is solved by a wood-based panel with antistatic properties with the features of the present disclosure.

Accordingly, a wood-based panel with antistatic properties is provided comprising at least one carrier board and at least one resin layer disposed on at least one side of the carrier board, wherein the at least one resin layer comprises
carbon-based particles, in particular carbon nanotubes (CNT) or graphene,
at least one compound having the general formula (I)

$$R^1_a R^2_b SiX_{(4-a-b)} \qquad (I),$$

and/or their hydrolysis products, wherein
X is H, OH or a hydrolyzable group selected from the group comprising halogen, alkoxy, carboxy, amino, monoalkylamino or dialkylamino, aryloxy, acyloxy, alkylcarbonyl, and
$R^1$ is an organic moiety selected from the group comprising alkyl, aryl, cycloalkyl, which may be interrupted by —O— or —NH—
wherein $R^1$ has at least one functional group $Q_1$ selected from a group containing a hydroxy, amino, monoalkylamino, carboxy, mercapto, alkoxy, aldehyde, acrylic, acryloxy, methacrylic, methacryloxy, cyano, isocyano and epoxy group,
$R^2$ is a non-hydrolyzable organic moety $R^2$ is selected from the group comprising alkyl, aryl, alkenyl, alkynyl, cycloalkyl, cycloalkenyl;
a=0, 1, 2, 3, in particular 1 or 2, and
b=1, 2, 3, or 4, in particular 0 or 1.

In an embodiment of the wood-based panel in question, the resin layer may contain at least one further compound of general formula (II)

$$R^3_c SiX_{(4-c)} \qquad (II),$$

and/or their hydrolysis products, wherein

X has the above meaning, $R^3$ is a non-hydrolyzable organic moiety $R^3$ is selected from the group comprising alkyl, aryl, alkenyl, alkynyl, cycloalkyl, cycloalkenyl, and c=1, 2, 3, or 4, in particular 1, 2 or 3.

In a preferred embodiment, the at least one resin layer comprises carbon-based particles, in particular carbon nanotubes (CNT) or graphene, at least one compound having the general formula (Ia)

$$R^1_a SiX_{(4-a)} \quad (Ia),$$

and/or their hydrolysis products, and at least one further compound of the general formula (II)

$$R^3_c SiX_{(4-c)} \quad (II),$$

and/or their hydrolysis products, wherein X, $R^1$, $R^3$, a and c have the above meaning.

According to this method, a resin layer is applied as a primer to a carrier board, in particular a wood-based material carrier board, this primer resin layer containing conductivity increasing agents. This agent is added to the already used priming resin, such as melamine-formaldehyde resin.

Carbon-based particles such as carbon nanotubes or graphene have proven to be particularly suitable conductivity agents. It has been shown, however, that for good conductivity it is important to be able to incorporate the carbon particles into the resin system without agglomeration. This is the only way to ensure that good electrical conductivity can be established even with small amounts of carbon particles. For this purpose, the carbon particles were modified on their surface with the silane compounds mentioned above. On the one hand, this serves the purpose of avoiding agglomeration and, on the other hand, of establishing a chemical bond with the melamine resin. The particles modified with the silane compounds can be easily incorporated into the resins used for impregnation.

The resulting advantages are a simple, process-technologically uncomplicated solution, a long-lasting effect and a relatively small application quantity, which keeps the overall costs low.

Carbon nanotubes are large macromolecules in the form of graphite films (a hexagonal lattice with sp$^2$ configuration), which are rolled up in the shape of a cylinder ("single-walled carbon nanotubes", SWNT). In addition to single-walled carbon nanotubes, carbon nanotubes with two or more walls are also known ("double walled carbon nanotubes" DWNT; multi-walled carbon nanotubes", MWNT), whereby the latter can be described in the form of a cylinder inserted into another cylinder.

Carbon nanotubes are characterized by high strength, low weight, a specific electronic structure, high stability and excellent electrical but also thermal and conductivity.

Single-walled carbon nanotubes (SWNT), double-walled carbon nanotubes (DWNT) or multi-walled carbon nanotubes (MWNT) can be used as carbon nanotubes (CNT), whereby particularly single-walled carbon nanotubes with a diameter between 1.0-2.5 nm, preferably between 1.5 and 2.0 nm and one between length 2-10 µm, preferably 4-8 µm, particularly preferably 5-6 µm are used.

A possible alternative to the use of carbon nanotubes are nano-layers of graphene. Graphene is a further modification of carbon with a two-dimensional aromatic structure in which each carbon atom is surrounded by three additional carbon atoms so that a honeycomb pattern is formed.

In one embodiment, the amount of carbon-based particles added to the resin is between 1.0 and 4.0% by weight, preferably between 1.5 and 3.5% by weight, and particularly preferably between 2.0 and 3.0% by weight.

The resin layers used for the base coat are preferably based on aqueous formaldehyde-containing resins, especially melamine-formaldehyde resin, urea-formaldehyde resin or melamine-urea-formaldehyde resin. Additional polymers are not contained in the resin used in this case.

The solids content of the resin layer containing the carbon-based particles is between 50-75% by weight, preferably 55-70% by weight, and especially preferably 60-65% by weight. The layer thickness of the resin layer containing the carbon-based particles is 10 and 100 µm, preferably between 40 and 80 µm, especially preferably between 45 and 60 µm.

The hydrolyzable moiety X of the compounds of the general formula (I), (Ia) and (II) is advantageously selected from a group containing H, OH, fluorine, chlorine, bromine, iodine, $C_{1-6}$-alkoxy, in particular methoxy, ethoxy, n-propoxy and butoxy, $C_{6-10}$-aryloxy, in particular phenoxy, $C_{2-7}$-acyloxy, in particular acetoxy or propionoxy, $C_{2-7}$-alkylcarbonyl, in particular acetyl, monoalkylamino or dialkylamino having $C_1$ to $C_{12}$, in particular $C_1$ to $C_6$. Particularly preferred is the residue X H, OH or alkoxy, especially methoxy, ethoxy, n-propoxy or i-propoxy.

The organic moiety $R^1$ of the compound of the general formula (I), (Ia) is preferably selected from a group comprising $C_1$-$C_{30}$ alkyl, in particular $C_5$-$C_{25}$ alkyl, $C_2$-$C_6$ alkenyl, $C_3$-$C_8$ cycloalkyl and $C_3$-$C_8$ cycloalkenyl. In one embodiment the organic $R^1$ is selected from the group containing methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, butadienyl or cyclohexadienyl, preferably methyl, ethyl, propyl or vinyl.

In one embodiment, the at least one functional group $Q_1$ of the compound of the general formula (I), (Ia) is selected from a group containing epoxide, hydroxy, ether, acrylic, acryloxy, methacrylic, methacryloxy, amino, alkoxy, cyano and/or isocyano group. The functional group $Q_1$ can therefore advantageously have a residue with a double bond or an epoxy group, which can be activated and polymerized by UV radiation.

In a variant of the present composition, compounds of general formula (I) according to $R^1_a R^2_b SiX_{(4-a-b)}$, in particular $R^1 SiX_3$ or $R^1 R^2 SiX_2$ with a functional group $Q_1$, may be selected from methacryloxypropyltrimethoxysilane (MPTS), aminoethyl-aminopropyltrimethoxysilane, silanes with an epoxy functionalization such as glycidyl-oxypropyltriethoxysilane, or silanes with a vinyl functionalization such as z.B. Vinyltrimethoxysilane.

As described, the residue $R^1$ can have at least one functional group $Q_1$. In addition, the residue $R^1$ can also be substituted with other residues.

The term "substituted", in use with "alkyl", "alkenyl", "aryl", etc., means the substitution of one or more atoms, usually H atoms, by one or more of the following substituents, preferably by one or two of the following substituents halogen, hydroxy, protected hydroxy, oxo, protected oxo, $C_3$-$C_7$ cycloalkyl, bicyclic alkyl, phenyl, naphthyl, amino, protected amino, monosubstituted amino, protected monosubstituted amino, disubstituted amino, guanidino, protected guanidino, a heterocyclic ring, a substituted heterocyclic ring, imidazolyl, indolyl, pyrrolidinyl, $C_1$-$C_{12}$ alkoxy, $C_1$-$C_{12}$ acyl, $C_1$-$C_{12}$ acyloxy, acryloyloxy, nitro, carboxy, protected carboxy, carbamoyl, cyano, methylsulfonylamino, thiol, $C_1$-$C_{10}$ alkylthio and $C_1$-$C_{10}$ alkylsulfonyl The substituted alkyl groups, aryl groups, alkenyl groups, can be substituted once or several times and preferably once or twice, with the same or different substituents.

The term "alkynyl", as used here, denotes a moiety of the formula R—C≡C—, in particular a "$C_2$-$C_6$ alkynyl". Examples of $C_2$-$C_6$ alkynyls include: ethynyl, propynyl, 2-butynyl, 2-pentinyl, 3-pentinyl, 2-hexyl, 3-hexyl, 4-hexyl, vinyl, and di- and tri-ins of straight and branched alkyl chains.

The term "aryl", as used herein, refers to aromatic hydrocarbons such as phenyl, benzyl, naphthyl, or anthryl. Substituted aryl groups are aryl groups which are substituted with one or more substituents as defined above.

The term "cycloalkyl" includes the groups cyclopropyl, cyclobutyl, cyclopentyl, cyclohexyl and cycloheptyl.

In a further embodiment, the non-hydrolyzable organic moiety $R^2$ of the compound according to formula (I) and the moiety $R^3$ of the compound according to formula (II) are selected from a group comprising $C_1$-$C_{15}$ alkyl, in particular $C_1$-$C_{10}$ alkyl, $C_2$-$C_6$ alkenyl, $C_2$-$C_6$ alkynyl and $C_6$-$C_{10}$ aryl. These may be unsubstituted or substituted with another hydrophobic group.

It is preferred when the non-hydrolyzable organic moiety $R^2$ and the moiety $R^3$ are selected from the group containing methyl, ethyl, n-propyl, isopropyl, n-butyl, s-butyl, t-butyl, pentyl, hexyl, heptyl, octyl, nonyl, cyclohexyl, vinyl, 1-propenyl, 2-propenyl, butenyl, acetylenyl, propargyl, phenyl and naphthyl. Methyl, ethyl, propyl, octyl, or phenyl residues are particularly preferred.

In the context of the present invention, the term "non-hydrolyzable organic moiety" is to be understood as an organic moiety which, in the presence of water, does not lead to the formation of an OH group or $NH_2$ group linked to the Si atom.

The compound of the general formula (I) may in particular comprise the moiety $R^2$ as $C_1$-$C_{10}$ alkyl group, preferably methyl, ethyl, propyl.

The compound of the general formula (II) may in particular comprise $R^3SiX_3$ with $R^3$ as $C_1$-$C_{10}$ alkyl group, preferably methyl, ethyl, propyl, pentyl, hexyl, heptyl, octyl, or as $C_6$-$C_{10}$ aryl group, preferably phenyl, and with X as alkoxy, in particular methoxy, ethoxy, n-propoxy or i-propoxy, such as octyltriethoxysilane, phenyltriethoxysilane.

In a variant of the present composition, a compound of general formula (Ia) and a compound of general formula (II) are used respectively.

The (molar) ratio of the silane compound of formula (Ia) to the silane compounds of formula (II) is preferably between 1:0.5 and 1:2, in particular preferably between 1:1 and 1:1.5.

In a particularly preferred variant of the present wood-based panel, the resin layer comprises carbon nanotubes modified with glycidyloxypropylmethyldiethoxysilane, glycidyloxypropyltriethoxysilane and octyltriethoxysilane, preferably a mixture of glycidyloxypropyltriethoxysilane and octyltriethoxysilane.

In another version, the resin layer of the present wood-based panel may contain inorganic particles, especially $SiO_2$, $Al_2O_3$, $ZrO_2$, $TiO_2$ particles. The particles preferably used for this purpose have a size between 2 and 400 nm, preferably between 2 and 100 nm, and especially preferably between 2 and 50 nm. The addition of the inorganic particles increases the solids content of the composition, which improves the application behaviour of the composition. The addition of inorganic particles also prevents shrinkage and cracking. The inorganic particles can be used in a quantity range of 0.1 to 25 wt %, preferably 5 to 20 wt %, based on the solids content of the silane material (sol-gel material).

The resin layer applied to the wood-based panel to improve the antistatic properties can be produced in a process comprising the following steps:
  Provision of at least one (aqueous) resin suspension;
  Addition of at least one catalyst, in particular an acid, to the at least one resin suspension;
  Addition of at least one compound of general formula (I) and at least one compound of general formula (II); and
  Dispersion of the carbon-based particles in the resin suspension using ultrasound (e.g. 160 W) and a dispersing tool (e.g. Ultraturax from IKA with 15 000 rpm).

Inorganic and/or organic acids suitable as catalysts are selected from a group containing phosphoric acid, acetic acid, p-toluene sulfonic acid, hydrochloric acid, formic acid or sulfuric acid. Also suitable are ammonium salts such as ammonium sulphate, which react as weak acids. p-Toluene sulfonic acid is particularly preferred.

For subsequent neutralization of the reaction mixture, a basic compound such as ammonia is preferably added. This leads to a separation of the aqueous phase with the binder portion from the alcoholic phase (ethanolic phase).

In the case that inorganic particles are added to the binder composition, the inorganic particles are preferably used in an amount between 0.1 to 15% by weight, preferably 0.5 to 10% by weight, especially preferably between 1 to 5% by weight.

In a further embodiment of the present wood-based panel, it is intended that at least one layer of a color base coat is arranged on the at least one resin layer containing the carbon-based particles.

The color base coat layer preferably used for this purpose comprises a composition of casein or corn protein as a binder and inorganic pigments, in particular inorganic color pigments. White pigments such as titanium dioxide can be used as color pigments in the color base coat layer or other color pigments such as calcium carbonate, barium sulphate or barium carbonate. In addition to the color pigments and casein, the primer can also contain water as a solvent. It is also preferred if the pigmented base layer applied consists of at least one, preferably at least two, in particular preferably at least four or five, successive layers or coats, whereby the quantity applied between the layers or coats may be the same or different.

In another embodiment of the present wood-based panel, at least one primer layer is provided on the at least one resin layer containing the modified carbon particles and the at least one color base coat layer.

The amount of liquid primer applied is between 1 and 30 g/m², preferably between 5 and 20 g/m², and especially preferably between 10 and 15 g/m². Isocyanate-based compounds are preferred as primers, with non-aromatic, aliphatic isocyanates, such as hexamethylene diisocyanate, isophorone diisocyanate, or prepolymers containing these isocyanates being particularly preferred.

In one embodiment of the present wood-based panel, at least one decorative layer is applied to the at least one primer layer.

The decorative layer can be applied by direct printing. In the case of direct printing, a water-based pigmented printing ink is applied by gravure or digital printing, whereby the water-based pigmented printing ink can be applied in more than one layer, e.g. in the form of two to ten layers, preferably three to eight layers.

In the case of direct printing, the application of at least one decorative layer is carried out as mentioned above by means of an analogue gravure and/or digital printing process. The gravure printing process is a printing technique in which the elements to be imaged are present as depressions in a printing plate which is inked before printing. The printing ink is mainly located in the recesses and is transferred to the object to be printed, e.g. a wood fibre carrier board, due to the contact pressure of the printing plate and adhesive forces. Digital printing, on the other hand, involves transferring the printed image directly from a computer to a printing machine, such as a laser printer or inkjet printer. The use of a static print form is not necessary. In both processes, the use of aqueous colors and inks or UV-based colorants is possible. It is also conceivable to combine the above-mentioned printing techniques from gravure and digital printing. A suitable combination of the printing techniques can be carried out directly on the carrier board or the layer to be printed or even before printing by adapting the electronic data sets used.

In a more advanced version of the present wood-based panel, at least one resin protective layer is provided on the decorative layer.

This resin protective layer is also based on aqueous formaldehyde-containing resins, especially melamine-formaldehyde resin, urea-formaldehyde resin or melamine-urea-formaldehyde resin.

The solids content of the resin protective layer is between 60 and 80% by weight, preferably between 65 and 70% by weight, especially preferably between 65 and 67% by weight. The amount of the resin protective layer applied to the decorative layer can be between 10-50 $g/m^2$, preferably 20-30 $g/m^2$, especially preferably 25 $g/m^2$.

In a particularly preferred embodiment, the resin protective layer contains glass beads that act as spacers. The preferred glass beads have a diameter of 90-150 µm. The glass beads can be applied together with the resin protection layer or can be sprinkled separately onto the resin protection layer. The amount of glass beads is 10 to 50 $g/m^2$, preferably 10 to 30 $g/m^2$, in particular preferably 15 to 25 $g/m^2$ or between 10 and 30 wt %, preferably between 15 and 25 wt %, in particular preferably 20 wt %. The batch preferably consists of approx. 40 kg resin liquid plus glass beads and auxiliary materials. The glass beads can also be in silanized form. Silanization of the glass beads improves the embedding of the glass beads in the resin matrix.

A resin-impregnated overlay paper can be applied to the resin protection layer on top of the wood-based panel. Parallel to the overlay paper, a backing paper can be provided on the underside of the wood-based panel. The entire layer structure is finally pressed, e.g. using a short-cycle press.

In a further embodiment of the present wood-based panel, it is intended that at least one layer of a further, second resin layer, in particular aqueous formaldehyde-containing resin layer, is applied to the resin protection layer instead of the overlay paper. The solids content of the further, second resin layer is between 60 and 80% by weight, preferably between 65 and 70% by weight, especially preferably between 65 and 67% by weight. The amount of applied resin layer can be between 10-50 $g/m^2$, preferably 20-30 $g/m^2$, especially preferably 25 $g/m^2$.

In a further embodiment, a resin layer can be applied to the underside of the wood-based panel parallel to the other, second resin layer on the upper side of the wood-based panel (but without glass beads). The amount of resin layer applied to the underside of the wood-based panel can be between 50-100 $g/m^2$, preferably 60-80 $g/m^2$, especially preferably 60 $g/m^2$. Preferably the lower resin layer (e.g. brownish) is colored to simulate a backing.

The resin layer(s) applied to the underside act as a backing. Applying the resin layers to the top and bottom of the wood-based panels in approximately equal quantities ensures that the tensile forces on the wood-based panel caused by the layers applied during pressing cancel each other out. The backing applied to the underside corresponds in the layer structure and the respective layer thickness approximately to the layer sequence applied to the upper side with the difference of the glass beads.

In another embodiment of the present wood-based panel, at least one layer of abrasion-resistant particles is applied to the second resin layer on the upper side of the wood-based panel.

As abrasion-resistant particles, particles of corundum (aluminium oxides), boron carbides, silicon dioxides, silicon carbides are preferably used. Corundum particles are particularly preferred. The preferred material is white high-grade corundum with a high degree of transparency, so that the visual effect of the underlying decoration is affected as little as possible. Corundum has an uneven spatial shape.

The amount of scattered abrasion-resistant particles is 10 to 50 $g/m^2$, preferably 20 to 40 $g/m^2$, especially preferably 25 to 30 $g/m^2$. The amount of abrasion-resistant particles scattered depends on the abrasion class to be achieved. For example, the amount of abrasion-resistant particles in the case of abrasion class AC3 is in the range between 10 to 15 $g/m^2$, in abrasion class AC4 between 15 to 20 $g/m^2$ and in abrasion class AC5 between 20 to 25 $g/m^2$.

Abrasion-resistant particles with grain sizes in the classes F180 to F240, preferably F200, are used. The grain size of class F180 covers a range from 53-90 µm, F220 from 45-75 µm, F230 34-82 µm, F240 28-70 µm (FEPA standard). In one variant, white corundum F180 to F240, preferably in a main particle size range of 53-90 µm, is used as abrasion-resistant particles. In a particularly preferred embodiment, corundum particles of class F200 are used, where F200 is a mixture between F180 and F220 and has a diameter between 53 and 75 µm.

The abrasion-resistant particles must not be too fine-grained (risk of dust formation), but also not too coarse-grained. The size of the abrasion-resistant particles is therefore a compromise.

Silanized corundum particles can be used in a more advanced form. Typical silanizing agents are amino silanes.

In a further embodiment of the present process, at least one further layer of a third resin layer, preferably up to three or four layers of a resin layer, is provided on the at least one scattered layer of abrasion-resistant particles on the top side of the wood-based panel. This resin layer is also based on a formaldehyde-containing resin with a weight percentage of between 60 and 80%, preferably 65 and 70%, and especially preferably between 65 and 67%. The amount of one layer of the applied resin layer can be between 10-50 $g/m^2$, preferably 20-30 $g/m^2$, especially preferably 25 $g/m^2$.

It is also preferred that this further resin layer includes glass beads and/or fibres, especially wood fibres or cellulose fibres. The use of glass beads in at least one of the layers is particularly preferred (e.g. 20% by weight of glass beads).

Parallel to this further, third resin layer on the top side of the present wood-based panel, another resin layer (but without glass beads) may also be provided on the underside of the wood-based panel. Preferably the lower resin layer (e.g. brownish) is colored to simulate a backing.

It should also be noted that additives such as hardeners, wetting agents, defoamers, release agents and/or other components can be added to all resin layers.

Finally, a further overlay layer can be provided on top of this multilayer structure, which is pressed with a backing paper in a short-cycle press.

Fibreboard, such as HDF. MDF, wood chipboard or wood fibre plastic boards, such as WPC boards are used.

In one embodiment, the present wood-based panel has the following layered structure (seen from bottom to top): backing-layer of backing paper-wood-based carrier board-colorless base coat layer with silane-modified carbon particles-color base coat layer-primer layer-print decor layer-resin protection layer with glass beads-possibly overlay layer.

In a further embodiment, the present wood-based panel has the following layered structure (seen from bottom to top): backing-layer of backing paper-backing of several layers of a resin layer-wood-based carrier board-colorless base coat layer with silane-modified carbon particles-color base coat layer-primer layer-print decor layer-resin protection layer with glass beads-resin layer-layer of abrasion-resistant particles-several layers of a resin layer (with glass beads in at least one layer).

The object of the present invention is also solved by a process for the production of the described wood-based panel.

Accordingly, a process for producing a wood-based panel with antistatic properties is provided, which comprises the following steps:
Providing a resin suspension comprising carbon-based particles, at least one compound of the general formula (I) and optionally at least one compound of the general formula (II);
Applying the resin suspension as a resin layer on the upper side of the carrier board;
Applying at least one layer of a color base coat layer;
Applying at least one layer of primer;
Applying at least one decorative layer;
Applying at least one protective resin layer,
optionally, placing a backing paper on the underside of the carrier board; and
Pressing of the layer structure.

In an embodiment, the process includes the following additional steps (before grouting):
Applying at least one second resin layer to the at least one resin protective layer on the upper side of the carrier board and, optionally, parallel applying a resin layer to the underside of the carrier board as a backing;
Scattering at least one layer of abrasion-resistant particles on the upper side of the carrier board;
Applying at least one layer of a further resin layer to the layer of abrasion-resistant particles on the upper side of the carrier board and, optionally, parallel applying a layer of a further resin layer to the underside of the carrier board as a backing,
optionally, placing a backing paper on the underside of the carrier board; and
Pressing of the layer structure.

In a preferred embodiment, a production line for carrying out the present process comprises the following elements:
at least one first application device for applying the resin suspension comprising carbon-based particles, at least one compound of the general formula (I) and at least one compound of the general formula (II) to the upper side of the carrier board;
at least one second application device for applying a color base coat layer;
at least one third application device for applying at least one primer layer;
at least one printing device for applying at least one decorative layer;
at least one fourth application device for applying at least one protective resin layer,
optionally, a device for placing an overlay paper on the upper side and a backing paper on the underside of the carrier board; and
at least one short-cycle press.

In a further embodiment, the production line also includes the following additional elements:
at least one fifth application device for applying at least one second resin layer to the at least one resin protective layer on the upper side of the carrier board and, optionally, parallel application of a resin layer to the underside of the carrier board as a backing;
at least one device for scattering at least one layer of abrasion-resistant particles on the upper side of the carrier board;
at least one sixth application device for applying at least one layer of a further resin layer to the layer of abrasion-resistant particles on the upper side of the carrier board and, if necessary, parallel application of a layer of a further resin layer to the underside of the carrier board as a backing, The application devices for the resin layers are either simple, single-sided application units for applying the colorless base coat primer layer, the color base coat, the primer layer and the resin protective layer, or double application units for parallel application of the further resin layers to the upper side and lower side (as a backing) of the carrier board, at least one drying device being provided behind each application unit for drying the upper and/or lower applied layers.

The scattering device provided for scattering the abrasion-resistant particles is suitable for scattering powder, granules, fibres and includes an oscillating brush system. The scattering device essentially consists of a storage hopper, a rotating, structured roller and a scraper. The application quantity of abrasion-resistant material is determined by the rotational speed of the roller. The scattering device preferably includes a spiked roller.

The invention is explained in more detail below with reference to the figures in the drawing, using examples of execution.

DESCRIPTION OF THE INVENTION

Figure 1:
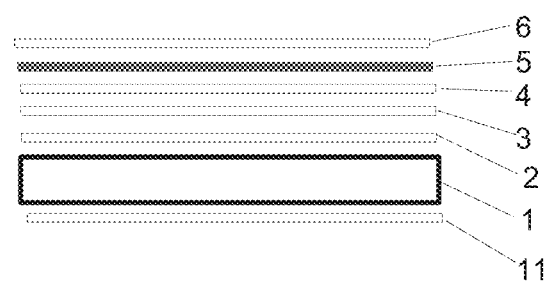
FIG. 1 is a schematic diagram of a wood-based panel according to a first embodiment of the invention.

FIG. 1 shows a cross-section of a first embodiment of the present wood-based panel with the following layer structure (seen from bottom to top): backing of backing-layer paper 11-wood-based carrier board 1-colorless base coat layer with silane-modified carbon particles 2-color base coat layer 3-primer layer 4-print decor layer 5-resin protection layer with glass beads 6-optional overlay layer 7 (not shown).

Figure 2:
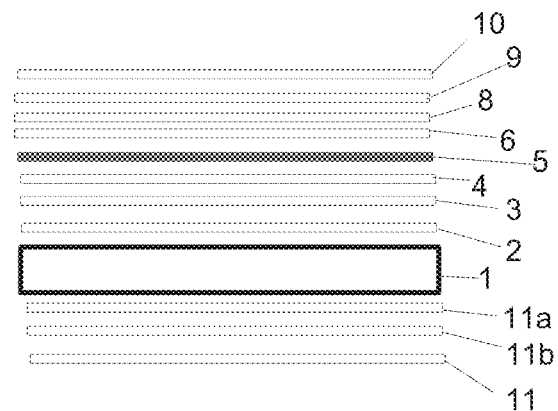
FIG. 2 schematic representation of a wood-based panel according to a second embodiment.

FIG. 2 shows the cross-section of a second embodiment of the present wood-based panel with the following layer structure (seen from bottom to top): Backing of backing paper 11-backing of several layers of a resin layer 11a, 11b-wood-based carrier board 1-colorless base coat layer with silane-modified carbon particles 2-color base coat layer 3-primer layer 4-print decor layer 5-resin protection layer with glass beads 6-resin layer 8-layer of abrasion-resistant particles 9-several layers of a resin layer (with glass bead in at least one layer) 10.

Example 1: Preparation of a First Resin Suspension with Modified Carbon Particles For modification, 90 g (or 80 g) of melamine-formaldehyde resin and 8.5 g (or 17 g) of water are added, followed by 0.08 g (or 0.16 g) of para-toluenesulphonic acid. To this aqueous solution 0.7 g (or 1.4 g) of gylcidyloxypropyltriethoxysilane and 0.16 g (or 0.32 g) of ocytyltriethoxysilane are added.

Then 1.5 g (or 3 g) of CNTs are dispersed in the solution using ultrasound and high shear (15 000 rpm ultraturray) and stirred at 40° C. for 30 minutes. This solution can now be processed like a normal resin system. (In parentheses are the specifications for the sample with 3% CNT in the resin)

Example 2: Preparation of a Second Resin Suspension with Modified Carbon Particles For modification, 98.5 g water is added and then 0.08 g para-toluenesulfonic acid. To this aqueous solution 0.7 g of gylcidyloxypropyltriethoxysilane and 0.16 g of ocytyltriethoxysilane are added.

Subsequently, 1.5 g CNTs are dispersed in the solution using ultrasound and high shear forces (15 000 rpm ultraturray) and stirred at 40° C. for 30 minutes. This purely aqueous solution can now be added to melamine resin directly at the application machine.

Example 3: Production of a First Wood-Based Panel According to FIG. 1

A melamine resin is applied to an HDF (8 mm) with a roller as a colorless base coat, which contains 1.5% by weight carbon nanotubes. The nanotubes had a length of about 5 µm and a diameter of 1.2 to 2.0 nm. The solids content of the fleet was about 60% by weight. The melamine resin contained the usual additives (hardeners, defoamers, wetting agents etc.). The melamine resin is dried in a circulating air dryer to a moisture content of 10 to 15%.

Afterwards, a colored base coat is applied to the colorless base coat layer. This consists of titanium dioxide and casein as a binding agent. A quantity of approx. 5 g color base coat/m$^2$ is alternately applied with subsequent intermediate drying in a circulating air dryer. This is repeated up to five times.

Then a primer is applied in liquid form in a quantity of approx. 10 g/m$^2$ and dried (circulating air dryer). A decor is then applied using either indirect gravure or digital printing. Drying takes place again in the circulating air dryer.

This is followed by the application of a protective layer consisting of melamine resin (65% by weight, with the usual additives) and glass beads (diameter: approx. 90 µm, approx. 20% by weight). Here, too, drying takes place in a circulating air dryer.

The coated HDF is then pressed on a short-cycle press with a backing and a corundum-containing overlay impregnate at high pressure (50 kp/cm$^2$) and high temperature (200° C.) for approx. 10 seconds. After cooling and subsequent air conditioning (50% rel. LF, 23° C.) the surface resistance was determined on the sample in accordance with DIN EN 1081: 2018. This resulted in a value of $1.0 \times 10^9 \Omega$. A value of $5 \times 10^{12} \Omega$ was found in a zero sample without carbon nanotubes. When testing various surface properties (behavior to water vapor, surface hardening by means of an acid test), no abnormalities were found.

Example 4: Production of a Second Wood-Based Panel as Shown in FIG. 2

On a HDF (8 mm), a melamine resin is applied with a roller as a colorless base coat, which contains approx. 3% by weight carbon nanotubes. The solids content of the fleet was about 60% by weight. The melamine resin contained the usual additives (hardeners, defoamers, wetting agents etc.). The melamine resin is dried in a circulating air dryer to a moisture content of 10 to 15%.

Afterwards, a colored base coat is applied to the colorless base coat layer primer. This consists of titanium dioxide and casein as a binding agent. A quantity of approx. 5 g color base coat/m$^2$ is alternately applied with subsequent intermediate drying in a circulating air dryer. This is repeated up to five times.

Then a primer is applied in liquid form in a quantity of approx. 10 g/m$^2$ and dried (circulating air dryer). A decor is then applied using either indirect gravure or digital printing. Drying takes place again in the circulating air dryer. This is followed by the application of a protective layer consisting of melamine resin (65% by weight, with the usual additives) and glass beads (diameter: approx. 90 µm, approx. 20% by weight). Here, too, drying takes place in a circulating air dryer. The boards were then coated in a coating line, first on the printed top side in a roller application unit with approx. 50 g melamine resin (approx. 65 wt. % with the corresponding auxiliary materials). At the same time, approximately the same amount of melamine resin (approx. 65% by weight with the appropriate additives and colored brown) was applied to the underside of the board.

Afterwards, approx. 20 g corundum/m$^2$ (F 200) is scattered on the upper side with a scattering device (Sandvik). The melamine resin is dried in a circulating air dryer. Then three more applications of 20 g melamine resin each (approx. 65% by weight with the corresponding auxiliary materials and approx. 20% by weight of glass beads) are applied and intermediately dried in a circulating air dryer. The same is done with the colored melamine resin without glass beads.

The coated HDF is then pressed on a short-cycle press with a backing and an overlay at high pressure (50 kp/cm$^2$) and high temperature (200° C.) for about 10 seconds. After cooling and subsequent air conditioning (50% rel. LF, 23° C.), a surface resistance was determined on a sample according to DIN EN 1081: 2018. This resulted in a value of $9.0 \times 10^8 \Omega$. With a zero sample a value of $3 \times 10^{12} \Omega$ was found. When testing various surface properties (behavior to water vapor, surface hardening by means of an acid test), no abnormalities were found.

The invention claimed is:
1. A wood-based panel having antistatic properties comprising at least one carrier board and at least one resin layer disposed on at least one side of the at least one carrier board, wherein
the at least one resin layer consists of:
aqueous formaldehyde containing resin(s);
carbon-based particles;

at least one compound having the general formula (Ia):

and/or hydrolysis products thereof,
wherein X is H, OH, or a hydrolyzable moiety selected from the group comprising halogen, alkoxy, carboxy, amino, monoalkylamino or dialkylamino, aryloxy, acyloxy, and alkylcarbonyl,
wherein $R^1$ is an organic moiety selected from the group comprising alkyl, aryl, $C_2$-$C_6$ alkenyl, $C_3$-$C_8$ cycloalkenyl, and cycloalkyl, which may be interrupted by —O— or —NH—,
wherein $R^1$ has at least one functional group $Q_1$ selected from a group comprising a hydroxy, amino, monoalkylamino, carboxy, mercapto, alkoxy, aldehyde, acrylic, acryloxy, methacrylic, methacryloxy, cyano, isocyano and epoxy group, and
at least one further compound of the general formula (II):

and/or hydrolysis products thereof,
wherein X has the above meaning,
wherein $R^3$ is a non-hydrolyzable organic moiety selected from the group comprising alkyl, aryl, alkenyl, alkynyl, cycloalkyl, and cycloalkenyl, and
wherein c is 1, 2, 3, or 4.

2. The wood-based panel according to claim 1, wherein X is selected from a group comprising H, OH, fluorine, chlorine, bromine, iodine, $C_{1-6}$ alkoxy, $C_{6-10}$ aryloxy, $C_{2-7}$ acyloxy, and $C_{2-7}$ alkylcarbonyl.

3. The wood-based panel according to claim 1, wherein $R^1$ is selected from a group comprising $C_1$-$C_{30}$ alkyl, $C_2$-$C_6$ alkenyl, $C_3$-$C_8$ cycloalkyl, and $C_3$-$C_8$ cycloalkenyl.

4. The wood-based panel according to claim 1, wherein the at least one functional group $Q^1$ is selected from a group comprising epoxy, hydroxy, ether, acrylic, acryloxy, methacrylic, methacryloxy, amino, alkoxy, cyano, and isocyano groups.

5. The wood-based panel according to claim 1, wherein the non-hydrolyzable organic moiety $R^3$ is selected from a group comprising $C_1$-$C_{15}$ alkyl, $C_2$-$C_6$ alkenyl, $C_2$-$C_6$ alkynyl, and $C_6$-$C_{10}$ aryl.

6. The wood-based panel according to claim 1, wherein at least one layer of a color base coat is provided on the at least one resin layer containing at least one carbon-based particle.

7. The wood-based panel according to claim 6, wherein at least one primer layer is provided on the at least one resin layer and the at least one color base coat layer.

8. The wood-based panel according to claim 1, comprising at least one decorative layer.

9. The wood-based panel according to claim 8, comprising at least one resin protective layer provided on the at least one decorative layer.

10. The wood-based panel according to claim 9, wherein a second resin layer is applied to the at least one resin protective layer.

11. The wood-based panel according to claim 10, wherein at least one layer of abrasion-resistant particles is applied to the second resin layer on the upper side of the wood-based panel.

12. The wood-based panel according to claim 11, wherein at least one layer of a further resin layer is provided on the at least one layer of abrasion-resistant particles.

13. A method of producing the wood-based panel according to claim 1, comprising the steps of
providing a resin suspension based on a formaldehyde containing resin comprising carbon-based particles, at least one compound of the general formula (Ia), and at least one further compound of the general formula (II);
applying the resin suspension as a resin layer to an upper side of the at least one carrier board;
applying at least one layer of a color base coat layer;
applying at least one primer layer;
applying at least one decorative layer;
applying at least one protective resin layer; and
pressing the layer structure in a short cycle press.

14. The method according to claim 13, comprising the steps of:
applying at least one second resin layer to the at least one protective resin layer on the upper side of the at least one carrier board and a parallel application of a resin layer to an underside of the at least one carrier board as a backing;
scattering of at least one layer of abrasion-resistant particles on the upper side of the carrier board;
applying at least one layer of a further resin layer to the at least one layer of abrasion-resistant particles on the upper side of the carrier board; and
pressing the layer structure.

15. The wood-based panel of claim 1, wherein the carbon-based particles are carbon nanotubes (CNT) or graphene.

16. The method of claim 13, comprising the step of placing a backing paper on an underside of the at least one carrier board.

17. The method of claim 14, comprising the step of applying a further resin layer to the underside of the at least one carrier board as a backing parallel with the step of applying the at least one layer of a further resin layer to the at least one layer of abrasion-resistant particles on the upper side of the carrier board.

18. The method of claim 14, comprising the step of placing a backing paper on the underside of the at least one carrier board as a backing.

19. The method of claim 17, comprising the step of placing a backing paper on the underside of the at least one carrier board as a backing.

* * * * *

UNITED STATES PATENT AND TRADEMARK OFFICE
CERTIFICATE OF CORRECTION

PATENT NO.         : 11,597,188 B2                                Page 1 of 1
APPLICATION NO.    : 16/835736
DATED              : March 7, 2023
INVENTOR(S)        : Andreas Gier et al.

It is certified that error appears in the above-identified patent and that said Letters Patent is hereby corrected as shown below:

In the Claims

Column 13, Line 20, Claim 1, delete "$R^3_c,SiX_{(4-c)}$" and insert -- $R^3_c SiX_{(4-c)}$ --

Signed and Sealed this
Ninth Day of May, 2023

Katherine Kelly Vidal
*Director of the United States Patent and Trademark Office*